United States Patent

[11] 3,541,911

| | | |
|---|---|---|
| [72] | Inventor | Josef Schiffers |
| | | Moenchengladbach-Rheindahlen, Germany |
| [21] | Appl. No. | 727,575 |
| [22] | Filed | May 8, 1968 |
| [45] | Patented | Nov. 24, 1970 |
| [73] | Assignee | Schloemann Aktiengesellschaft |
| | | Duesseldorf, Germany |
| | | a German Company |
| [32] | Priority | May 11, 1967 |
| [33] | | Germany |
| [31] | | No. Sch 40695 |

[54] SHEAR BLADES
4 Claims, 4 Drawing Figs.

[52] U.S. Cl. .................................................. 83/694,
83/698
[51] Int. Cl. ...................................................... B26d 1/06
[50] Field of Search ........................................... 83/694, 698

[56] References Cited
UNITED STATES PATENTS
2,539,602  1/1951  Wehr............................. 83/694
FOREIGN PATENTS
8,251  4/1906  Great Britain................ 83/694

Primary Examiner—William S. Lawson
Attorney—Holman, Glascock, Downing & Seebold

ABSTRACT: A shear blade, comprising: upper and lower shear saddles, upper and lower cutter blocks secured in the upper and lower shear saddles, each cutter block consisting of a filler bar and a cutting blade, dovetail-shaped teeth connecting the two filler bars with their associated shear saddles, the gaps between the said teeth being wider than the coacting teeth, and the teeth on the two filler bars being of corresponding depth but of opposite inclination to one another.

The apparatus includes a carriage movable transversely to the cutting blades, an adjusting device for moving the upper cutter block parallel to the cutting blades, receiving lugs mounted on the carriage and adapted to engage in horizontal longitudinal slots in the lower filler bar.

Patented Nov. 24, 1970

INVENTOR.
JOSEF SCHIFFERS.

BY Glascock, Downing & Seebold
ATTORNEYS

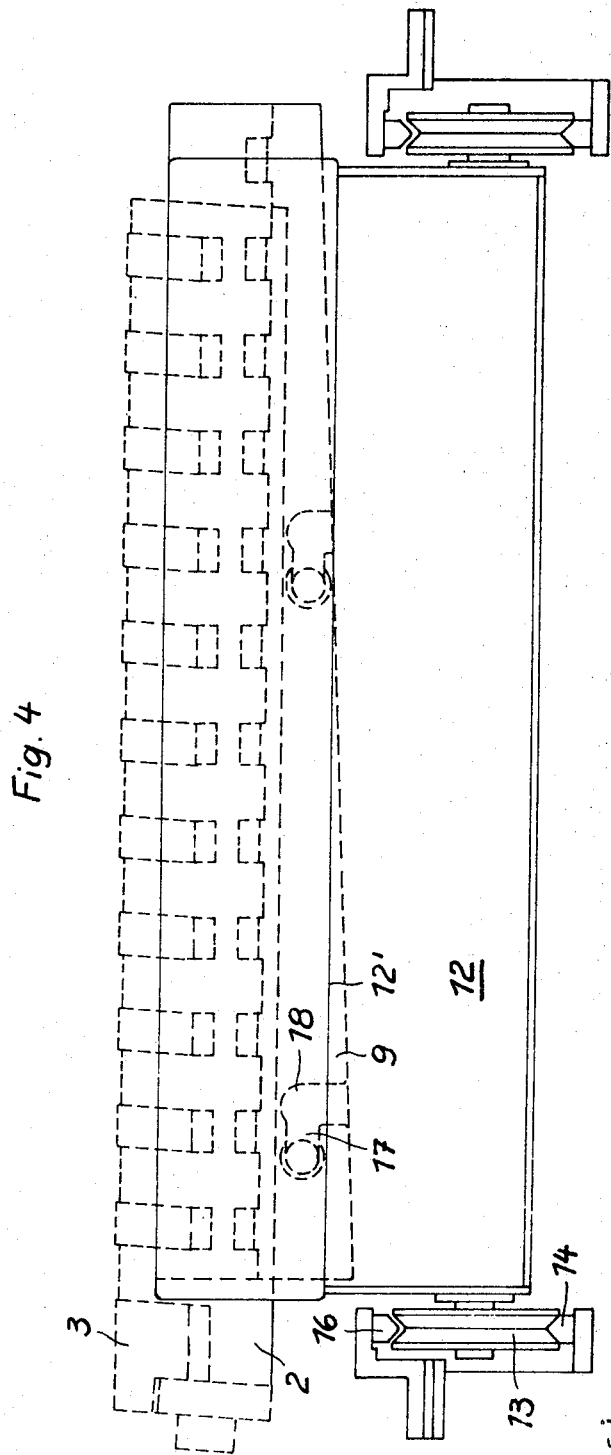

SHEAR BLADES

This invention relates to a shear blade with an upper cutter block and a lower cutter block, each of which consists of a filler bar and a blade beam inserted therein, and each of which is secured in a shear saddle. The preparation of the cutter blocks has the advantage that the time-consuming adjusting work, on a finishing train of rolls for instance, is obviated, and the cutter blocks can be suitably prepared and kept in stock. It is inevitable, however, that after many hours of uninterrupted operation a standstill has to be taken into consideration, in order to enable the cutter blocks to be exchanged. Owing to the considerable weight of the cutter blocks, this operation is not only difficult to carry out, but, owing to the spatial extent, it occupies a great deal of room. The requisite space for driving out the cutter blocks in the longitudinal direction of the blade beam is not available, above all when a train of rolls is to be provided with a very long shear blade. Furthermore, for the upper cutter block and the lower cutter block, two separate run-out appliances are still required, which mostly can also only be actuated in succession.

The object of the present invention is to improve a shear blade of the kind hereinbefore described, in such a way that the cutter blocks can be changed without difficulty, even under restricted space conditions. Above all, the time occupied by changing is also reduced, and separate changing appliances for the upper and lower cutter blocks are obviated. This is substantially attained, according to the invention, by the fact that the filler bars, with their individual shear saddles, are provided with dovetail-shaped teeth, the teeth being spaced apart in the longitudinal direction of the blade, and the spaces being made wider than the individual teeth with which they engage. The teeth on the upper and lower filler bars are of the same depth, but have an opposite inclination to one another. In this way one arrives at a shear blade which needs to be displaced only by a short distance out of its mounted position in the longitudinal direction of the blade, in order to disengage the dovetail-shaped teeth of the shear saddle from those of the filler bar. Thereupon the entire cutter block can be taken out transversely to the longitudinal direction of the blade, either in a horizontal or in a vertical direction.

In addition to this, the identical depth of the teeth ensures, in the upper and lower filler bars, that after an appropriately dimensioned transverse displacement of the lower cutter block, the upper cutter block, after the release of the securing means and the requisite longitudinal displacement, can engage with its teeth in those of the lower cutter block, and can be transported together with the latter. The same means, with which the cutter blocks are brought into engagement with their shear saddles, can therefore also, according to this suggestion, be employed for bringing the two cutter blocks into engagement with one another, so that separate discharge devices for the upper and lower cutter blocks are unnecessary.

It is advantageous to provide the lower filler bar with horizontal longitudinal slots, which have enlarged apertures at the end, into which receiving lugs, capable of traveling transversely to and also parallel to the length of the blade, and provided with holding heads, can be introduced. The result is thereby obtained that the lower cutter block, after the introduction of the cutter block by a short displacement of the reception lug, admits of being locked in the cutting direction.

In this case the lugs form at the same time the abutment for the position of the cutter block, in which its teeth pass out of engagement with those of the lower shear saddle. From this position outwards the lower cutter block then admits of being lifted out transversely to the blade direction, by withdrawal of the receiving lugs, its tooth side being turned away from the receiving lugs, so that the upper cutter block can now be inserted therein, which renders possible the joint transport of the two cutter blocks.

One embodiment of the invention will now be further described by way of example with reference to the accompanying drawings, wherein:

FIG. 4 shows a front view of the transport device with cutter blocks inserted.

Figure 1:
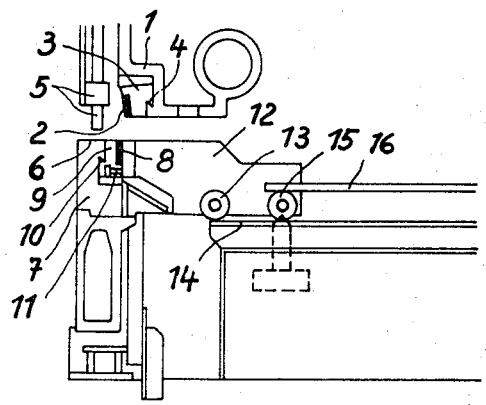
FIG. 1 shows a partial cross section through the new shear blade, with receiving lugs, when run into the lower filler bar.

As FIG. 1 shows, a cutter block consisting of an upper cutting blade 2 and an upper filler bar 3, is inserted in an upper shear saddle 1, with the aid of the dovetail-shaped toothing 4. Beside the upper cutter block is to be seen a holding-down device 5, which presses a sheet metal strip marginally, during the trimming, with the aid of the shear blade, against the table surface 6 of a lower shear saddle 7, which carries a lower cutter block consisting of a cutting blade 8 and a filler bar 9, with a toothing 10.

Into the filler bar 9 of the lower cutter block are introduced receiving lugs 11, with widened heads. The receiving lugs 11 are mounted on the end face of a carriage 12, which can travel transversely to the direction of the blade. It is made topheavy, as FIG. 1 shows, so that its front wheels 13 run upon a lower rail 14 and its rear wheels 15 upon an upper rail 16. In this way constant traveling properties are always obtained.

Figure 2:
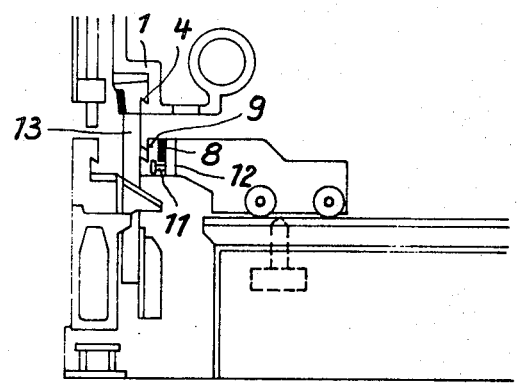
FIG. 2 shows a view corresponding to FIG. 1, but with the lower cutter block run out in a transverse direction.
Figure 3:
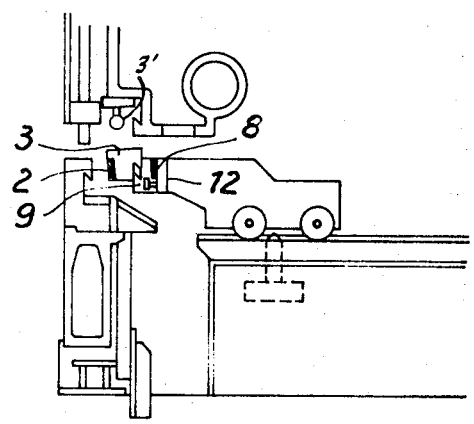
FIG. 3 shows a cross section corresponding to FIG. 1, with lower and upper cutter blocks located in a transport position.

In FIG. 2, the carriage 12, of which only the end section is shown, with the lower cutter block 8, 9 held by the receiving lugs 11, is retracted a short distance transversely to the longitudinal direction of the blade 1. The carriage 12 is then arrested in a position in which the lower cutter block, carried by the receiving lugs, stands with its vertical tooth surfaces underneath the vertical tooth surfaces of the upper shear saddle 1. At the same time, supporting rams 13 (FIG. 2) which support the upper cutter block 2, 3 are raised. The upper cutter block 2, 3 is equipped with an adjusting device, which may consist for instance of hydraulic cylinders 3', as shown in FIG. 3, actuating it in the longitudinal direction of the blade. The upper cutter block can thereby be displaced a short distance in the longitudinal direction of the blade, so that the toothing 4 passes out of engagement, and the cutter block 2, 3 as a whole is carried further up by the supporting rams 13, which can be raised and lowered. The rams 13 are then lowered, whereupon the toothing of the upper cutter block 2, 3 meshes with the toothing of the lower cutter block 8, 9 so that both the cutter blocks can be transported out of the position represented in FIG. 3 with the help of the carriage 12. The carriage 12, after delivering this pair of cutter blocks, can accommodate another pair of cutter blocks, which are then, in the same manner but in the reverse sequence, inserted in the cutter block carriers of the shear blade.

In the front view, FIG. 4, the carriage 12 stands with its front wheels 13 upon the lower rails 14, whereas the upper rails 16, on which run the rear wheels 15, not shown in FIG. 4, are not in contact with the front wheels 13. Above the body of the carriage 12 is to be seen the contour 12' of the end face of the carriage, on which the two cutter blocks bear for the purpose of transport. The lower filler bar 9 is shown, in which longitudinal slots 17 are machined, which terminate in enlarged apertures 18, for the accommodation of the lugs 11. Into the lower cutter block 8, 9 the upper cutter block 2, 3 is inserted by means of toothing extending in the longitudinal direction of the blade, so that in this position it can be transported jointly with the lower cutter block.

The securing of the cutter blocks in the cutter block holders may be effected in any convenient manner, for instance with the aid of slidable wedges or the like.

I claim:

1. A shear blade, comprising: an upper cutter block, consisting of an upper filler bar and an upper cutting blade, and a lower cutter block consisting of a lower filler bar and a lower cutting blade, upper and lower shear saddles in which the two cutter blocks are respectively secured, dovetail-shaped toothing connecting the two filler bars with their individual shear saddles, the toothing consisting in each case of individual teeth which are of less width than the gaps between the coacting teeth, and the teeth of the upper and lower filler bars being of corresponding depth but of opposite inclination to one another, the lower filler bar being formed with horizontal longitudinal slots, each with an enlarged aperture at one end, and the shear blade also comprising receiving lugs, capable of traveling both parallel to the cutting blade and transversely to the cutting blade, the lugs being formed with holding heads, and being adapted to engage in the said longitudinal slots.

2. A shear blade as claimed in claim 1, further comprising: an adjusting device for moving the upper cutting block in the longitudinal direction of the blade, into and out of engagement with the lower cutter block, and supporting rams, capable of being raised and lowered, for supporting the upper cutter block.

3. A shear blade as claimed in claim 2, further comprising: a carriage capable of traveling transversely to the cutting blade, the receiving lugs being mounted on this carriage, and means for arresting the carriage in a position in which the vertical surfaces of the teeth on the lower cutter block are underneath the vertical surfaces of the teeth of the upper shear saddle, which carries the upper cutter block.

4. A shear blade as claimed in claim 3, further comprising: front wheels and upper and lower rear wheels on the carriage, lower rails, on which the front wheels of the carriage bear, and upper rails against which upper rear wheels of the carriage can bear, the carriage being made topheavy in such a way that the upper rear wheels tend to bear against the upper rails.